Dec. 6, 1960   G. TROJANOWSKI ET AL   2,962,767
MOLDING PROCESS
Filed March 1, 1956
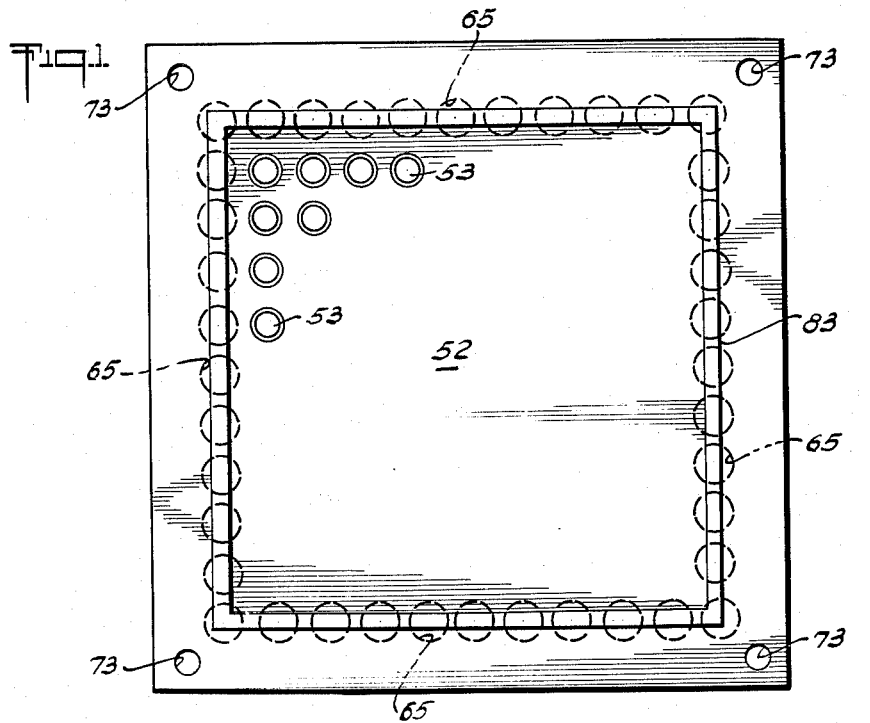
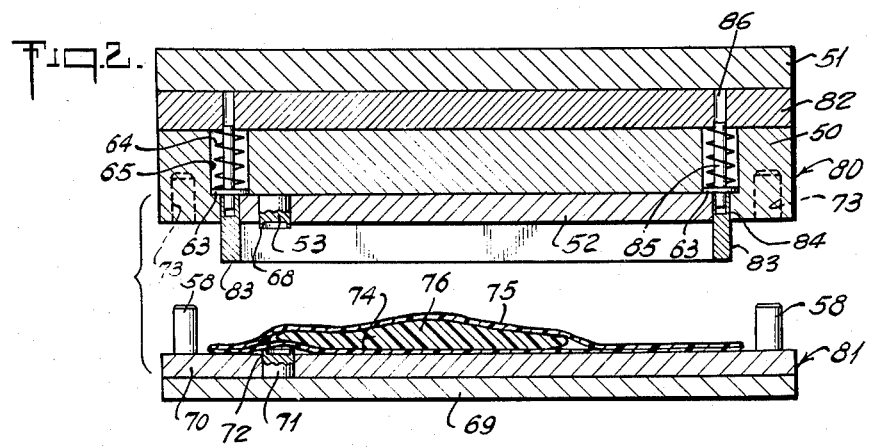
INVENTORS:
GEORGE TROJANOWSKI
LAWRENCE BRANDT
BY
ATTORNEY:

United States Patent Office 2,962,767
Patented Dec. 6, 1960

2,962,767

MOLDING PROCESS

George Trojanowski, East Meadow, and Lawrence Brandt, Hicksville, N.Y., assignors to Oceana International, Inc., Brooklyn, N.Y.

Filed Mar. 1, 1956, Ser. No. 568,769

9 Claims. (Cl. 18—58)

The present invention relates to an improved molding process and apparatus for the manufacture of molded articles of various kinds from heat-hardenable substantially liquid resins, and particularly from addition type resins of thermosetting character.

In the molding of liquid addition type resins it is known to fill the individual cavities in the lower part of a mold with measured amounts of resin and then place a sheet of cellophane or cellulose ester over such filled cavities in order to aid the escape of trapped air as the mold is closed, a sufficient excess of resin being deposited in such cavities to provide for filling the registering complementary cavities in the upper part of the mold (when these are present) and for flash. This process has, however, not proved to be entirely satisfactory in actual practice for a number of reasons. In the first place, when the resin is mobile in character, air bubbles are apt to be trapped within the masses of resin as it is poured into the cavities, and it is impractical to wait until the bubbles have risen to the surface of the relatively viscous resin. With less mobile or semi-liquid resins, measurement of exact quantities is difficult and, in addition, the danger of trapping air between the mass of resin and the walls of the cavity is great, and increases with the complexity of the shape of the cavity. As a result, a large proportion of the molded articles is defective by reason of the entrapped air. Moreover, the ejection of the molded articles from the lower cavities is generally difficult; and as the resins remain tacky short of the completely cured state, any attempt to increase the output of a mold by heating the resin to just past the gelled state, removing the only partially cured articles, and completing the curing outside the mold, is out of the question.

It is the general object of the present invention to provide an improved method and apparatus for molding liquid or liquefiable addition type resins in a simplified and economical manner.

More specifically, it is an object of the invention to provide a molding process and apparatus whereby the removal of the molded article or articles from the cavity or cavities of the mold is facilitated.

A further object of the invention is to provide a molding process and apparatus wherein a large number of articles can be simultaneously molded in a multi-cavity mold without the necessity for measuring out separately the quantity of resin for each individual cavity.

It is a still further object of the invention to provide an improved molding process and apparaus wherein the trapping of air bubbles in the molded articles is substantially completely eliminated.

Another object of the invention is to provide a molding process and apparatus in which a mass of liquid or semi-liquid thermosetting resinous compositions sufficient for a plurality, and especially for a large number of small articles, such as buttons, can be charged in bulk into a multi-cavity mold to produce a multiplicity of articles with a minimum of flash or other waste.

Still another object of the invention is to provide a process for molding addition type resins wherein the incompletely cured article or articles can be removed from the mold even though they are still in a more or less tacky and fragile condition, and the curing completed outside the mold.

Other objects and advantages of the invention will appear from the detailed description thereof hereinafter.

The present invention eliminates the above-mentioned disadvantages of the prior method of molding liquid polymerizable or hardenable resins by utilizing a bag into which a measured amount of liquid resinous composition is filled and the bag thereafter sealed. The amount of resin is that which is sufficient to fill all of the cavities with a small excess for flash. The bag is made of a film which is highly stretchable in all directions, as will be described more fully hereinbelow. The sealed bag in then placed upon the lower part of a two part mold, so that the lower wall of the bag is interposed between the mass of resin and the lower mold cavities. The parts of the mold, which is heated, are then closed. After the bag has been sealed, and either before it has been placed upon the bottom mold plate, or after this step has been performed, and in any event prior to the closing of the mold, the interior of the bag is evacuated of its content of air, for example, by introducing a hypodermic needle thereinto and applying suction to the needle. Upon removal of the needle, the small hole left by it either seals itself, or can be quickly sealed by the application of a suitable plastic or adhesive material or of adhesive tape.

It will readily be seen that by this procedure the laborious filling of the individual cavities with the accompanying entrapment of air is eliminated. Moreover, as the bag can be quite efficiently exhausted of the air contained therein, the incidence of defective articles is reduced practically to zero. As the mold closes, and the heated resin is forced to enter both the lower and upper cavities, it forces the stretchable wall of the bag tightly against the walls of the cavities. Hence, upon completion of the molding cycle and opening of the mold, the bag can be readily pulled out of the mold with articles inside the bag. The resin is thus at no time in direct contact with the metallic mold parts themselves, so that upon removal of the bag at the end of a cycle, the mold is clean and is immediately available for the next cycle.

By the use of a molding bag in accordance with the present invention, articles can be molded of very complex and irregular shapes, the walls of the bag expanding or stretching under the influence of the heat and pressure, so as to lie snugly against the walls of cavities; the bag serving at the same time, as already indicated, as a unitary ejecting device at the end of the cycle for all of the simultaneously molded articles, which may be several hundred in number, as in the case of buttons.

A satisfactory degree of stretchability for the walls of the bag is one of the order of at least about 100%, but may be from 400 to 600%, and even higher, at the temperature of the molding operation. In addition to its stretchability, the plastic film must be able to withstand the molding temperature and be non-reactive toward, and not miscible with or soluble in, the liquid resin, and not be adhesive with respect to the metallic mold parts. We have found bags made of films of polyvinyl alcohol to be highly suitable for our purpose, but other pliable and highly stretchable films having substantially the same properties and meeting the same requirements may be employed.

The invention will now be further described in connection with the accompanying drawings which illustrate by way of example suitable molding apparatus for carrying out our process. In said drawings, Fig. 1 is a bottom plan view of the top mold part or half; while Fig. 2 is a vertical section through the mold in the open condition.

As the invention is of particular value for the simultaneous molding of a large number of small articles, the mold shown in the drawing is constructed for use in molding buttons, and the invention will be further described in connection with the manufacture of such articles.

The mold shown in the drawing is illustrated also in our simultaneously filed application entitled "Process and Apparatus for the Manufacture of Molded Articles," Ser. No. 868,768, and consists of two parts, indicated by the numerals 80 and 81, the upper mold part including a die retainer plate 52 in which are embedded a large number of dies 53, of which only one is illustrated. The heating plate 51 is heated in any suitable manner (as by steam, oil, or electrically), and between such plate and the plate 52 there are disposed the spring housing plate 50 and a guide plate 82. Surrounding the dies 53 is a continuous ring 83 which, in the case of a square mold, is itself more or less of square shape. The ring 83 slides in a recess 84 disposed either between the plates 50 and 52, or within one of them. A relatively large number of bores or chambers 65 is provided in the plate 50 and they are distributed uniformly along the ring 83. These chambers house compression springs 64, each of which bears upon a plate 63 of circular shape which is free to slide vertically within the chambers. A guide rod 85 is connected to each of the plates 63, and at their upper ends the rods are received within guide bores 86 in plate 82. The lower ends of the rods extend below the plates 63 and are secured in any suitable manner to the ring 83. It will be evident that the ring 83 can rise only against the resistance of the springs 64.

The lower mold part includes the die retainer plate 70 in which are embedded the complementary dies 71 (of which only one is shown) registering with the upper dies 53. A heating plate is shown diagrammatically at 69. Secured to and extending from the plate 70 approximately at the corners thereof are guide pins 58 which are adapted to be received within guide bores 73 in the plate 50.

In carrying out our process, the sealed bag composed of the stretchable films 74 and 75 and having therein a sufficient amount of resinous composition to fill all of the cavities with a slight excess, and prepared as described below, is placed upon the bottom mold part 81, so that it overlies all of the dies 71 and extends underneath or beyond the ring 83. The bottom mold part 81 is now raised to effect distribution of the resin within the cavities and gelling or curing of the molded articles. Should the resinous composition be too stiff for ready flow, the initial movement of the mold bottom 81 can be slowed or can even be interrupted as soon as the film 75 touches the retainer plate 52 to allow the resin to be heated sufficiently to insure adequate fluidity.

As will be readily understood, as the bag is raised toward the plate 52, the retainer ring 83 will engage the outer margin of the top film 75 and act to prevent flow of resin outside the molding area. However, as the mold part 81 continues to rise and the pressure on the mass of resin increases, any excess resin will be forced outwardly between the upper and lower films and against the resistance of the springs bearing on the ring 83. The ring 83 normally projects below the surface of the plate 52 to an extent such that it engages the top film 75 before any considerable pressure is applied against the mass of resin, so that the retaining or sealing ring 83 becomes effective before the resin begins to spread between the films. We prefer to give the springs 64 a pre-set pressure of about 200 lbs. each to insure an effective seal as soon as the ring is lifted by the mold part 81.

The cycle period can be so chosen that the articles are either partially or completely cured. The partially or completely cured articles are easily ejected from the cavities with the aid of the plastic bag upon opening of the mold. The incompletely cured articles can be further cured in an oven, or in hot water, or in any other type of heated liquid, such as mineral oil, which does not dissolve the plastic film, or, where it does dissolve such film, has no solvent or chemical action on the cured resinous composition.

The pressure exerted by the mold press should be sufficient to force the resin into the cavities within the time allowed by the molding cycle. This pressure can amount to 190 or more tons for a 20 inch by 20 inch molding area (950 or more lbs./sq. in.); however, the pressure may be as low as about 75 lbs./sq. in. This pressure should of course be considerably greater than the pressure exerted by the springs 64. For a molding area of the size above specified, about 21 springs can be employed each exerting about 600 lbs. pressure in the closed condition of the mold.

The cycle time from the moment that the mold begins to close is about 75 seconds for complete cure of articles of the approximate size of buttons and made with a polyester resin. About 10 seconds are allowed for the closing of the mold. As already indicated, the cycle period can be made even smaller by curing the articles only incompletely in the mold.

The lands 68 and 72 of the dies 53 and 71 may be either flush with the surface of the retainer plates 52 and 70 or may extend a short distance beyond the same. The use of projecting lands has the advantage that as the mold closes, the mass of resin in each pair of complementary cavities is pinched off from any surrounding flash. The height of the lands 68 and 72 is preferably approximately equal to the thickness of the films in the unstretched or uncompressed condition, with the result that in the areas surrounding the lands, i.e., in the regions between the dies, only a very thin flash will be formed, but such flash will be cut off from the mass of resin 76 in the cavities.

Our invention contemplates the molding of various kinds of objects, including articles having substantial thickness or of relatively complex form, such as shank buttons and objects of even more irregular form. Accordingly, the films 74 and 75 must be capable of considerable stretch or elongation without rupture as they are drawn or pulled into the mold cavity by the flowing resin and line the walls of the cavities. For some purposes a film capable of stretching to the extent of only about 100% in all directions will be found satisfactory; however, for thicker objects or more complicated shapes, a stretch of 400 to 600% or even higher is preferred.

We have found polyvinyl alcohol films to be particularly well suited for use in our process, as they are strong, have a high stretchability and are heat-resistant. Polyvinyl alcohol films can withstand the temperature employed in our process and are characterized by an elongation of 400 to 600% and even more, so that quite complicated objects can be molded with the aid of such films. Films of cellulose acetate, cellulose acetate-butyrate, and cellulose triacetate have sufficient stretch to be used for the manufacture of various articles according to our process, and this applies to cellulose esters generally.

Tests have shown that cellophane is not suitable for use in the molding of articles having any considerable depth, as it does not have sufficient elongation before rupture sets in. It can, however, be used where the cavity is entirely in one mold part, the other mold part presenting a substantially flat surface, and against such flat surface the cellophane sheet can be employed. With such cellophane sheet there would then have to be employed a film capable of being stretched to the extent of at least about 100%, such as a film of polyvinyl alcohol, which would be placed against the mold part carrying the cavities, or the deeper cavities.

For small shank buttons, the polyvinyl alcohol film can have a thickness of 0.0015 to 0.003 inch. For flat shirt buttons, this thickness can range from 0.001 to 0.002 inch. In general, for objects requiring a deeper draw of the films, the greater thicknesses of film will be used.

As already indicated, the molding compositions employed in our process comprise liquid or semi-liquid thermosetting resins of the addition type, i.e., polymerizable resins or mixtures of resinous condensates and monomers which do not liberate water of condensation or other vapors or gases on gelling or polymerizing. Suitable addition type thermosetting resins are the known polyester and epoxy resins, various formulations of which are commercially available. We have obtained very satisfactory results with "Laminac" 4120 and 4134 manufactured by American Cyanamid Co. The first of these resins yields a rigid product, which the second produces flexible articles. Mixtures of these compositions may be employed, such as a mixture of 85% to 97% of Laminac 4120 and 15% to 3% of Laminac 4134. Another commercially available group of resins which can be employed are those sold under the trademark "Selectron" by Pittsburgh Plate Glass Co., of which No. 5027 yields relatively rigid, while No. 5124 yields relatively flexible products. As in the case of the Laminac resins, mixtures of Selectron resins may be employed, and likewise mixtures of Laminac and Selectron resins, depending upon the combination of properties desired in the molded articles. Especially after the addition thereto of fillers or pigments, the resinous compositions may be pasty in form at room temperature. Among the epoxy types of resins that can be used are those sold by Ciba under the trademark "Araldite," and by Shell Chemical Co. under the trademark "Epon." When the catalyzed resins have a short "pot life," the catalyst is added shortly before molding.

Where the resins are quite solid at room temperature, such as certain epoxy resins, they can be fused by heating to a temperature short of gelling, after which the catalyst or catalysts of known character are mixed therewith and the mixture then placed on a film in the heated condition immediately prior to molding.

In molding the Laminac resins, the temperature of the bottom part of the mold can be kept permanently at about 225° F., while the temperature of the top part of the mold is about 195° F. but can be considerably higher, for example 245°–260° F., depending upon the nature and quality of the catalyst and the type of resin employed. The reaction is exothermic in character, so that if larger articles are molded, the mold temperature itself can be lower. The quantity of catalyst contained in the resin will be determined by the cycle period of the molding operation which in turn will depend upon the size or thickness of the molded article.

Our invention is of particular advantage in the manufacture of buttons having a pearly or pearlescent appearance. For this purpose, there is incorporated in the resin a quantity of pearl essence, such as fish scales, or known artificial materials, like iridescent flakes. Our process causes considerable flow of the resin, so that the fish scales or other pearlescence-producing material become properly oriented to produce very pleasing pearlescent effects. Other known surface appearance-modifying materials can likewise be added to the resin, such as pigments and dyes, and also various inert fillers.

The following examples of molding compositions are presented by way of illustration and are not to be construed as indicating the scope of the invention:

*Example 1*

The following composition is suitable for the molding of polyester buttons with a pearly effect which is an integral part of the molded product, the parts being by weight:

Laminac 4120 _____ 95
Laminac 4134 _____ 5
Pearl essence _____ 2
Luperco ATC (catalyst) _____ 2

The Laminac resins, as already stated, are polyester resins, 4120 being a rigid type, and 4134 a flexible type. Luperco ATC is a 50:50 mixture of benzoyl peroxide and tricresyl phosphate, and is used as the catalyst for the polyester resins.

The rigid resin, Laminac 4120, is mixed with the catalyst Luperco ATC in a dough type mixer. The pearl essence is mixed with the flexible resin Laminac 4134 in a turbine type mixer. In the latter case, care must be taken so as not to destroy the pearl flakes. Then the required amount of pearl essence-flexible resin mixture is added to the rigid resin-catalyst mixture in the dough type mixer and mixing continued until uniformity is attained. The resultant mixture has a viscosity of 14,000 centipoises at 75° F. and a useful pot life of more than two weeks if maintained at normal room temperatures.

The resin is then de-aerated either by applying vacuum or by allowing the mixture to stand undisturbed at room temperature until all the air has risen to the surface. In either case, the time for de-aeration depends upon the temperature of the mixture, the size and amount of air bubbles introduced in the mixing operation, and the height of liquid being de-aerated. At a room temperature of 75° F., usually 4 hours are sufficient for vacuum de-aeration, while allowing the mix to stand overnight is sufficient for natural de-aeration. When applying vacuum, the reduced pressure should not go below the vapor pressure of any volatile component, such as the cross-linking monomeric styrene, at the temperature of the mix.

A measured amount of the de-aerated resin is then dispensed into an open bag and the fourth side of the bag is sealed. This can be accomplished either by heat-sealing, or by the use of an adhesive, or electronically. Any air trapped in the bag upon sealing thereof is removed by inserting into the bag a hypodermic needle attached to a vacuum pump. Upon the removal of the air, the hole made by the needle is sealed with a pressure-sensitive tape or by means of heat.

As shown in Fig. 2, the bag can be composed of two films 74 and 75 with the mass of resinous composition 76 between them. The bag is placed upon the bottom mold part 81, so that it overlies the whole molding area. The outer edges of the bag extend preferably slightly beyond the ring 83. The mold is now closed and the resinous composition is subjected to a temperature of 240° F. for about 80 seconds under a pressure of 250 lbs. per square inch in the case of the composition of Example 1. The stretchable films 74′ and 75′ are forced by the compressed resin to enter the mold cavities and line the walls of the latter, so that when the molding is completed, the molded articles, such as buttons, are removed with the bag as a unit from the mold. The bag is then torn open and the molded articles removed. The bag is readily pulled out of the cavities and the mold is left in clean condition, ready for the next heat.

The films 75′ and 76′ are preferably made of polyvinyl alcohol and are 0.002 inch thick. With this type of film, the bag can be heat-sealed after the measured quantity of resin has been placed therein.

*Example 2*

The proportions of the components of the composition can be varied to modify the properties and surface appearance of the products, an example of a modified formulation being the following, the parts being by weight:

Laminac 4120 _____ 93
Laminac 4134 _____ 7
Natural pearl essence (fish scales) _____ 1
Luperco ATC _____ 1

This composition will require a somewhat longer cycle period because of the smaller amount of catalyst.

Example 3

The following is a known composition based on an addition type epoxy resin the parts being by weight:

| | |
|---|---|
| Araldite 6010 (Ciba) | 100 |
| Araldite HN951 (Ciba) | 12 |

The Araldite HN951 is an amine type hardener (catalyst) which at 212° F. effects hardening in 10 to 30 minutes, depending on the size of the molded article, but at higher temperatures considerably shorter cycle periods are adequate.

In carrying out our process and employing a 441-cavity button mold, we employ about 200 grams of the resin composition, which includes an excess of about 10 to 20 grams for the flash. The excess can be reduced in amount but it is desirable to provide always for a certain amount of flash because of the difficulty in measuring exactly the viscous liquid or even pasty resinous composition.

It will be seen from the foregoing that the present invention overcomes in a practical manner one of the problems associated with the molding of liquid resins, namely, the elimination of air from the molding cavities as the mold is closed. Such entrapped air forms bubbles in the molded articles and renders them commercially inferior or useless. When the liquid resin is poured directly into the lower cavities, as heretofore proposed, not only is it essentially that the resinous composition be highly mobile, but the trapping of air is extremely difficult to avoid, with the result that many of the molded articles show defects in the form of air bubbles. By the use of a plastic bag in accordance with the present invention, a single measured quantity of resin, sufficient for all of the die cavities (plus a slight excess), can be placed inside the bag and the latter then de-aerated. The completely de-aerated bag can then be placed as a unit upon the lower half of the mold and the mold then closed, as above described. By the process of the present invention, therefore, it is possible to mold as many as 441 buttons and even more with a considerably reduced amount of flash or waste and of defective products as compared with prior molding procedures.

When the mold cavity or cavities are entirely in one of the mold parts, the face of the other mold part being then smooth and free from cavities, the side of the bag facing such other mold part need not be of highly stretchable character but may consist of cellophane or other film of low stretchability, and even of paper or the like. If the paper is sufficiently porous for the resin to penetrate it, this will ordinarily not be a disadvantage, as articles like buttons are turned or ground down to the finished shape. The highly stretchable film, like polyvinyl alcohol, can be adhesively secured to the other film to form the bag.

To insure escape of excess resin, and thereby keep the thickness of the flash between the mold cavities at a minimum, small grooves or orifices can be cut in the retaining ring 83 through which the excess resin can escape, should the resistance exerted by the ring become too great. However, by this time, the mold cavities will all have been filled with resin encased in the stretched film. The retainer ring can be replaced by a rubber or other compressible gasket which can be similarly provided with escape ports for the excess resin at the maximum pressures of the mold. The springs acting on the retaining ring can be replaced by pneumatic or hydraulic pressure.

Where the molding temperature is high and the film of the bag is easily formed or shaped, the retaining mechanism may be dispensed with as the resistance of the bag walls themselves and the strength of the seal uniting the films forming the bag, can act as a retaining force to keep the resin within the molding area until the cavities are all completely filled. In these cases, the pressure needed to force the pliable and easily extensible bag film (owing to the high mold temperature), against the walls of the cavities is very small and the bag will not be in danger of rupturing until after the mold cavities are completely filled.

The charging of the resin into a plastic bag has the further advantage that the resin-bag composite can be suspended over the mold area and between the upper and lower parts of the mold until the mold begins to close. In this way, the opposite sides of the mass of resin are heated uniformly by the two halves of the mold and local overheating and uneven curing are avoided. Thereby a better control of uniformity and also of the shrinkage of the finally cured products are obtained.

As will be understood from the foregoing, the resin is kept out of contact with the mold parts by the pliable and plastic bag. The mold itself as well as the dies can therefore be made of any suitable material without consideration of any effect of the metal on the resin and vice versa. As the resin never touches the mold parts, the operation is a very clean one, and the mold is ready for the next cycle as soon as the films with the molded articles between them are removed.

The resin-containing plastic bag can be pre-heated to any desired condition outside the press, and thereby be readied for molding. Such pre-heating imparts better formability and aids in proper orientation of such additions as pearl essence particles, owing to the fact that the viscosity is reduced by the heating. In addition, the press cycle period can be reduced, and the output of the molding press is thereby increased. Also, the resin can be spread out uniformly between the upper and lower films of the bag, so as to extend over an area corresponding to the molding area prior to the actual molding operation and outside the mold itself. This provides uniform distribution of the resinous material and results in a minimum of flow during molding which is desirable in certain cases, as in the molding of articles having an integral sheen, wherein minimum flow is necessary to obtain certain desired effects. Also, if the resinous composition contains fillers or pigments which do not flow as readily as the resin, the uniform spreading of the resin in the bag prior to molding will insure more uniformly molded pieces. In this spread-out condition, the resin can also be chilled or frozen both for storage purposes and for producing certain desirable effects during molding.

As is known in the art, increase in the flow of the resin can offer important advantages especially with regard to the orientation of pearlescent or iridescent flakes such as pearl essence, and the like, contained in the resin. To insure a high degree of flow, the bag can be divided into connecting channels by sealing the bag in such a manner that the resin must flow along a labyrinthine course, i.e., in a zig-zag manner across the area of the bag. The seals will in such case overlie areas between rows of cavities and the successive seals will start alternatingly at opposite ends of the bag and each seal line will terminate short of the opposite end of the bag. The resin mixed with various additions like catalyst, accelerator, plasticizer, dye, pearlescent flakes, etc., will in such case be placed in one of the terminal channels and the closing of the mold will be so controlled that the resin will flow through all of the channels before the mold is closed. In this way, very beautiful effects can be obtained with pearl essence, for example, that have not heretofore been achieved.

It is also possible with our bag process to meter uncatalyzed resinous compositions into the bag and add the catalyst to the resin (followed by sealing of the bag) just prior to molding. It therefore becomes unnecessary to be concerned with the pot life of the resins. After the catalyst has been added, with or without an accelerator, the mixture in the bag can then be kneaded to mix the resin with the catalyst.

The completely sealed bag, following de-aeration, can be stored for various lengths of time, depending upon the reactivity of the resin and the catalyst, without danger of air bubbles finding their way into the resin. If desired, the bags can be kept under refrigeration until required.

Our process also makes it possible to provide the whole surface of the molded article with special surface effects which are integral with the main body of the articles. Thus, the molded articles can be provided with an integral surface layer of any desired color, pattern or texture, by coating the inside surfaces of the upper and lower films with a composition which will fuse with the molding resin 76 into an integral resinous mass. The color, design, light-reflecting properties, texture, and the like, imparted by the coatings on the two films may be harmonious or contrasting. The inside surfaces of the films can be provided with the desired coating by spraying, brushing, stencilling or in any other suitable manner. The coatings can contain a resin of the same character as the molding composition, or it may be of a different type of resin which is miscible or compatible with the molding resin. The resinous coating can be gelled or conditioned in any suitable way in the films before the bag is formed. Special effect coatings can also be applied by reverse roll coating devices, and also can be applied in the form of a solution, after which the solvent is evaporated and the resinous coating heated until the desired consistency is obtained, which should, however, preferably be short of the final insoluble, infusible condition.

If the coatings on the films are gelled prior to the molding operation, this will prevent any substantial flow of the special effect resin into the mass of molding resin. On the other hand, if some degree of mixing is desired to give a more random effect, the special effect resin can be air-dried until its surface has lost most of its tack. The gelling of the special effect resin can be accomplished either by heat or by the use of a cold-setting catalyst, or by a combination of both. The special effect resins can be transparent, translucent or opaque and with or without internal sheen and with or without iridescent or pearlescent flakes. Mottled effects can be produced by using a plurality of colors. Polyvinyl alcohol films are especially well adapted for this purpose, because they are hydrophilic in nature and the resinous coating therefore separates readily from the films.

While we have described our invention as applied to the manufacture of buttons, it will be evident that our process is of wide application for the molding of a great variety of articles and of different sizes, such as knife handles, parts for toys and games, articles of jewelry, and other ornamental objects, boxes, casings for various types of instruments, etc. Button and other blanks may likewise be molded by our process to their final shapes.

We claim:
1. Process for molding articles, which comprises placing a substantially liquid molding resin composition into a pliable bag made of a stretchable film material capable of stretching at least 100% without rupture, sealing the bag, subjecting the bag to heat while positioned between the two parts of a heated mold provided with one or more cavities, gradually closing the mold so as to compress the bag to force the liquid resin to press the walls of the bag against the walls of the mold cavity or cavities and simultaneously with the compression of the resin composition yieldingly clamping the peripheral region of the bag to confine within the molding area the quantity of resin required to fill the mold cavity or cavities while allowing excess resin to escape outside the molding area as the mold reaches the closed position, whereby the liquid resin within the bag assumes the shape of said cavity or cavities, removing the bag from the mold after the resin composition has hardened, and thereafter removing the molded articles from the bag.

2. Process for molding articles which comprises placing a substantially liquid molding resin composition into a pliable bag made of a stretchable film material capable of stretching at least 100% without rupture, sealing the bag, de-aerating the bag, subjecting the bag to heat while positioned between the two parts of a heated mold provided with one or more cavities, gradually closing the mold so as to compress the bag to force the liquid resin to press the walls of the bag against the walls of the mold cavity or cavities, whereby the liquid resin within the bag assumes the shape of said cavity or cavities, removing the bag from the mold after the resin composition has hardened, and thereafter removing the molded articles from the bag.

3. Process for molding articles, which comprises placing a quantity of a substantially liquid thermosetting addition type resinous composition into a bag composed of pliant material, the side or sides of the bag facing a mold cavity having a degree of stretchability of the order of at least 100%, at least one side of the bag facing a mold cavity being composed of a film of polyvinyl alcohol, sealing the bag, perforating the bag and subjecting the interior thereof to suction to remove air and then sealing the perforation, placing the bag between the two parts of a heated mold having one or more cavities, gradually closing the mold and thereby subjecting the resinous composition to pressure to cause the resin to force the bag walls to press tightly against the walls of the cavity or cavities, finally closing the mold and subjecting the resinous composition to elevated temperatures to cause setting of said composition, opening the mold, and removing the bag with the molded article or articles therein.

4. Process according to claim 1, wherein all parts of the interior of the bag overlying the mold cavities are maintained in communication with each other to enable the liquid resin to distribute itself uniformly to all the mold cavities by the time that the parts of the mold are completely closed.

5. Process according to claim 1, wherein the resin composition comprises a thermosetting polyester resin.

6. Process for molding articles, which comprises placing a quantity of a substantially liquid thermosetting addition type resinous composition into a bag composed of pliant material, the side or sides of the bag facing a mold cavity having a degree of stretchability of the order of at least 100%, sealing the bag, perforating the bag and subjecting the interior thereof to suction to remove air and then sealing the perforation, placing the bag between the two parts of a heated mold having one or more cavities, gradually closing the mold and thereby subjecting the resinous composition to pressure to cause the resin to force the bag walls to press tightly against the walls of the cavity or cavities, finally closing the mold and subjecting the resinous composition to elevated temperatures to cause setting of said composition, opening the mold, and removing the bag with the molded article or articles therein.

7. Process for molding articles, which comprises charging a measured amount of a thermosetting substantially liquid resinous composition of the addition type into a bag of pliant and stretchable material having a degree of stretchability of the order of at least 100% without rupture, sealing the bag, removing air from the bag, gradually closing the two parts of a two-part heated mold containing a plurality of pairs of complementary cavities with the bag between them, to cause the liquid to press and expand the walls of the bag tightly against the walls of the cavities, maintaining communication among the pairs of complementary cavities within the interior of the bag until the mold is completely closed and at such time pinching the bag about each cavity to seal the resin therein, heating the resinous composition to cause hardening thereof, opening the mold, and removing the bag with the molded articles therein.

8. Process according to claim 1, wherein the pliable bag is made of a film material having a degree of stretchability of at least 400% without rupture.

9. Process according to claim 1, wherein the pliable bag is made of polyvinyl alcohol film.

References Cited in the file of this patent

UNITED STATES PATENTS

| | | |
|---|---|---|
| 1,072,915 | Cook et al. | Sept. 9, 1913 |
| 1,596,739 | Kinsley | Aug. 17, 1926 |
| 2,370,572 | Muskat | Feb. 27, 1945 |
| 2,406,403 | Rogers | Aug. 27, 1946 |
| 2,485,798 | Whyte et al. | Oct. 25, 1949 |
| 2,513,785 | Browne | July 4, 1950 |
| 2,613,397 | Borkland | Oct. 14, 1952 |
| 2,652,597 | Sucher | Sept. 22, 1953 |
| 2,673,371 | Uhlig | Mar. 30, 1954 |